United States Patent [19]

Nakayama

[11] Patent Number: 4,994,815
[45] Date of Patent: Feb. 19, 1991

[54] TRACKING CONTROLLER FOR THREE-AXIS MOUNT ANTENNA SYSTEMS

[75] Inventor: Makoto Nakayama, Tokyo, Japan

[73] Assignee: NEC Corporation, Japan

[21] Appl. No.: 324,951

[22] Filed: Mar. 16, 1989

Related U.S. Application Data

[63] Continuation of Ser. No. 52,684, May 20, 1987, abandoned.

[30] Foreign Application Priority Data

May 21, 1986 [JP] Japan .................................. 61-117783
Nov. 19, 1986 [JP] Japan .................................. 61-277156

[51] Int. Cl.$^5$ .............................................. H01Q 3/00
[52] U.S. Cl. ..................................................... 343/765
[58] Field of Search ................................... 343/765, 766

[56] References Cited

PUBLICATIONS

Air Force Manual; "Communications-Electronics Terminology"; pp. 39–672, 3; Apr. 1959.
Markus; Electronics Dictionary; McGraw-Hill; 4th ed.; p. 581; Jan. 1986.

Primary Examiner—William L. Sikes
Assistant Examiner—Robert E. Wise
Attorney, Agent, or Firm—Laff, Whitesel, Conte & Saret

[57] ABSTRACT

In a satellite tracking control system, a receiver derives a pair of elevation (EL) and cross-elevation (XEL) tracking error signals having a quadratic relationship in a coordinate system from a signal received from a polar-orbital satellite. Elevation and cross-elevation motors are respectively controlled in response to the elevation (EL) and cross-elevation (XEL) tracking error signals. An azimuth controller derives an azimuth control signal from angle data representing the angles of the antenna about the azimuth, elevation and cross-elevation axes detected by angle detectors. Preferably, the antenna is rotatable about the elevation (EL) axis in the range between zero and 180 degrees.

13 Claims, 6 Drawing Sheets

TRACKING CONTROLLER FOR THREE-AXIS MOUNT ANTENNA SYSTEMS

This application is a continuation of application Ser. No. 07/-52,684, filed May 20, 1987 now abandoned.

BACKGROUND OF THE INVENTION

The present invention relates to a tracking controller for a three-axis mount antenna system in which the antenna is rotatable about an azimuth (AZ) axis, an elevation axis (EL) and a cross-elevation axis (XEL).

Japanese Patent Publication No. 60-22803 published on Feb. 5, 1985 discloses a three-axis (AZ-EL-XEL) mount antenna system to overcome the overhead pass problem of the known AZ-EL mount antenna system without having to develop an expensive X-Y mount. In the AZ-EL-XEL mount system, the antenna is turned about a horizontally exending elevation axis through an angle of 90 degrees from horizontal to vertical and operates in AZ/EL and cross-EL/EL drive modes. A satellite tracking controller derives an elevation (EL) error signal and a cross-EL (XEL) error signal from signals received from a polar-orbital satellite and applies the EL error signal to an elevation drive system during both AZ/EL and XEL/EL drive modes and applies the XEL error signal to an azimuth drive system during AZ/EL drive mode or a cross elevation drive system during XEL/EL drive mode. Since the XEL error signal is switched between the azimuth and cross-EL drive systems, however, a "cosec" compensation circuit must be inserted into and removed out of the system to adjust the response characteristic of the azimuth drive system to ensure smooth operation of the system when switching occurs, as a result of which the system becomes complex and expensive.

SUMMARY OF THE INVENTION

An object of the present invention is therefore to provide a simplified satellite tracking controller by eliminating the need for switching a tracking signal between different motors.

This object is obtained by controlling elevation and cross-elevation motors respectively in response to elevation (EL) and cross-elevation (XEL) tracking error signals supplied from a receiver and controlling an azimuth motor in response to a signal supplied from an azimuth controller which in turn derives it from angle data (AZ, EL, XEL) supplied from angle detectors. Preferably, the antenna is rotatable about a horizontally extending elevation axis in the range between zero and 180 degrees.

BRIEF DESCRIPTION OF THE DRAWINGS

The present invention will be described in further detail with reference to the accompanying drawings, in which.

DETAILED DESCRIPTION

Figure 1:
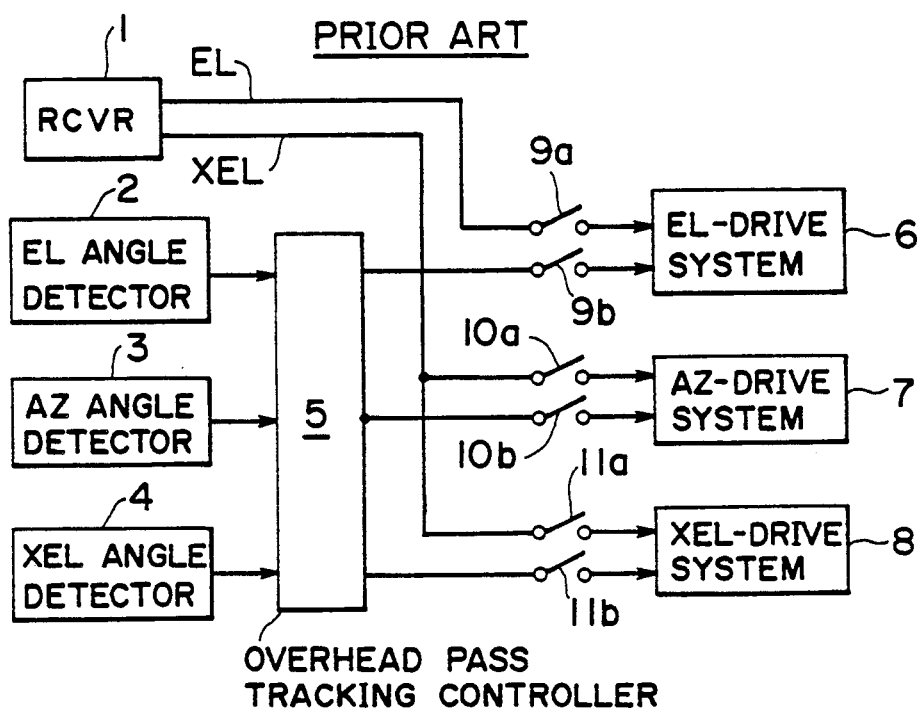
FIG. 1 is a block diagram of a prior art antenna tracking controller.
Figure 2:
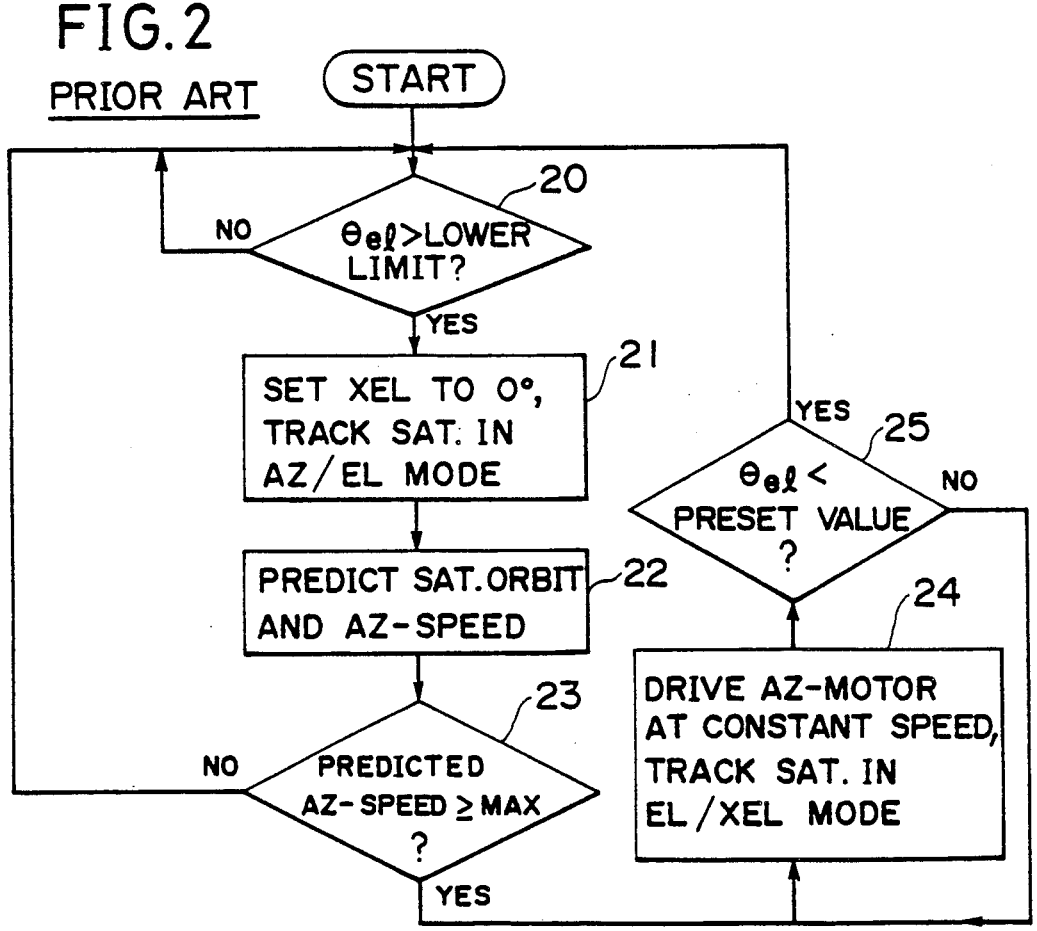
FIG. 2 is a flowchart describing a sequence of instructions programmed in the prior art tracking controller.

Prior to description of the present invention, it is appropriate to describe a prior art satellite tracking system for a three-axis (AZ-EL-XEL) mount antenna system. With this prior art system, the antenna is rotatable about an elevation axis through an angle of 90 degrees from horizontal to vertical. The tracking system includes a receiver 1 which detects tracking errors in a coordinate system from signals received from a polar-orbital satellite. Signals respresenting the tracking errors are referred to as an EL (elevation) error signal and a cross-EL (XEL) error signal. The EL error signal is applied to an elevation drive system 6 through a switch 9a during both AZ/EL and XEL/EL drive modes and the XEL error signal is applied through a switch 10a to an azimuth drive system 7 during AZ/EL drive mode or via a switch 11a to a cross elevation drive system 8 during XEL/EL drive mode. Signals representing the angles of elevation, azimuth and cross-elevation are supplied from angle detectors 2, 3 and 4 to an overhead pass tracking controller 5 which operates either in a programmed tracking mode or an automatic tracking mode. During a programmed tracking mode, the outputs of controller 5 are connected through switches 9b, 10b and 11b to the respective drive systems. During an automatic tracking mode, switches 9 to 11 are operated in a manner described with reference to FIG. 2. In FIG. 2, when the angle of elevation ($\theta_{el}$) exceeds a lower limit (block 20), the controller 5 makes initial acquisition of a satellite. When signals received from the satellite become sufficient in strength to allow the controller 5 to operate the antenna in a self tracking mode, it directs the cross-XEL drive system 7 through switch 11b to fixedly set the cross-elevation angle of the antenna to zero and operates switches 9a and 10a to apply the EL and XEL error signals to the elevation and azimuth drive systems 6 and 7, respectively, to track the satellite in an AZ/EL drive mode with the elevation and azimuth drive systems 6 and 7 (block 21). Controller 5 monitors the elevation angle ($\theta_{el}$) and at each time this angle exceeds a predetermined value computes angle data to predict a satellite orbit for the determination of satellite position and the rotational speed of the antenna about AZ axis which will be attained when the satellite is making an overhead pass (block 22). Decision block 23 allows the controller to repeatedly excute the blocks 20, 21 and 22 until the predicted rotational speed becomes equal to or greater than a maximum, typically 10 degrees per second. When this occurs, control proceeds to operations block 24 to operate switches 9a and 11a to allow the system to operate in an EL/XEL tracking mode using the elevation and cross-elevation drive systems 6 and 8 and operate the azimuth drive system 7 to provide azimuth rotation at a constant speed. Exit from block 24 is decision block 25 which allows the controller 5 to repeatedly execute the block 24 until the angle of elevation (EL) becomes smaller than a preset value. When the latter is reached, control returns to block 20 to execute the blocks 20 to 23, so that the tracking operation terminates when the angle of elevation decreases below the lower limit.

However, complex circuitry results from the necessity for inserting a "cosec" compensation circuit into and removing it out of the system to adjust the response characteristic of the azimuth drive system so that the system operates smoothly when the XEL signal is switched between the azimuth and cross-EL drive systems.

The present invention avoids the complexity problem by eliminating the need for switching the XEL error signal between the cross-elevation and azimuth drive systems.

Figure 4:
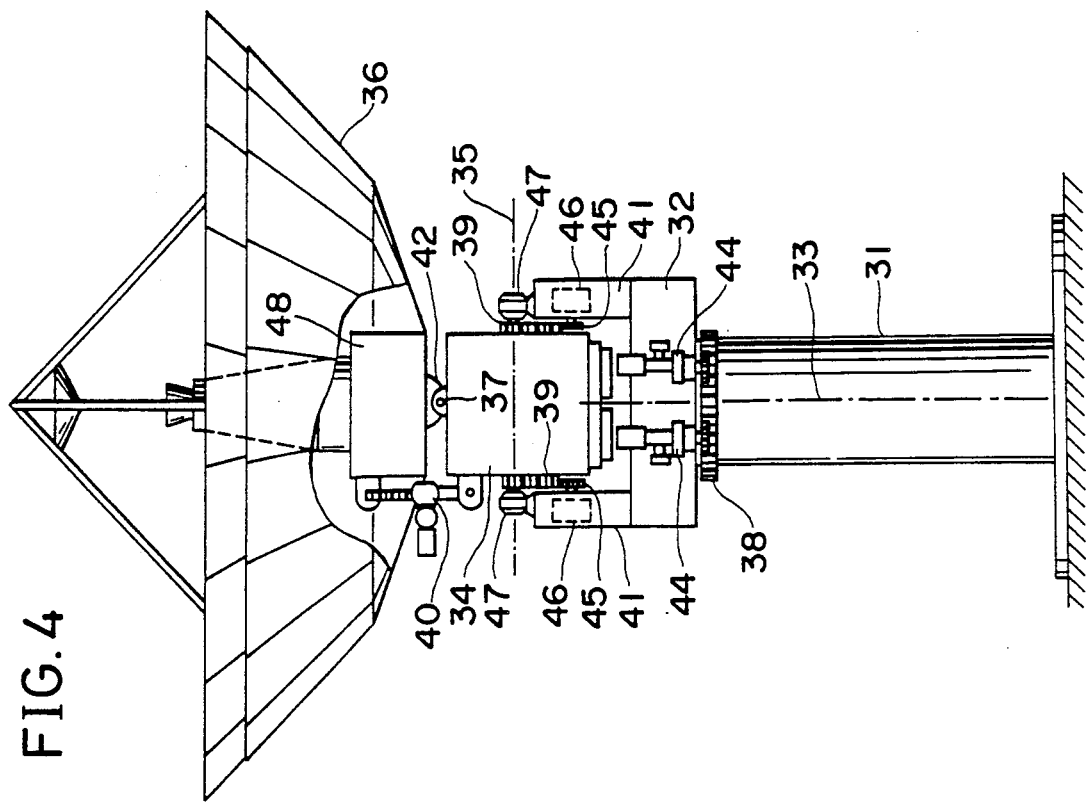
FIG. 4 is a rear view of the antenna system.
Figure 3:
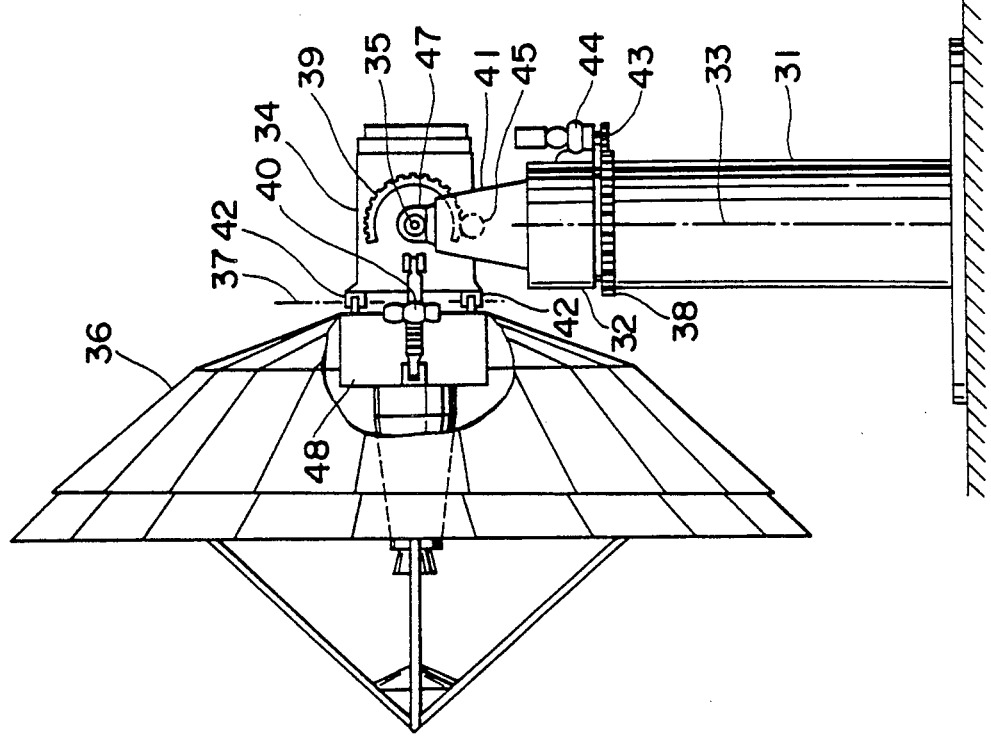
FIG. 3 is a view in side elevation of an antenna system according to the present invention.

Referring to FIGS. 3 and 4, there is shown a three-axis mount antenna system of the invention. The antenna system comprises an azimuth support 31 which is anchored to ground, an elevation support 32 which is rotatably mounted on the azimth support 31 in the range of ±270 degrees about an azimuth (AZ) axis 33 and carries an equipment room 34 on upstanding supports 41. Equipment room 34 is rotatable on elevation bearings 47 about an elevation (EL) axis 35 through an angle of 180 degrees. An antenna 36 is fixed to the forward end of the equipment room 34 by cross-EL bearings 42 to rotate about a cross-elevation (XEL) axis 37 in the range of ±5 degrees. The azimuth rotation of the antenna is provided by an azimuth bull gear 38 which is secured to the azimuth support 31 in mesh with pinions 43 of azimuth motors 44 mounted on the elevation support 32. The rotation of the antenna about the EL axis 35 is provided by a pair of elevation bull gears 39 which secured one on each side of the equipment room 34 in mesh with pinions 45 of elevation (EL) motors 46 mounted within the supports 41. The rotation of antenna about the cross-EL axis 37 is provided by a cross-EL screw jack 40 secured between a center hub 48 and the forward end of equipment room 34.

Figure 5:
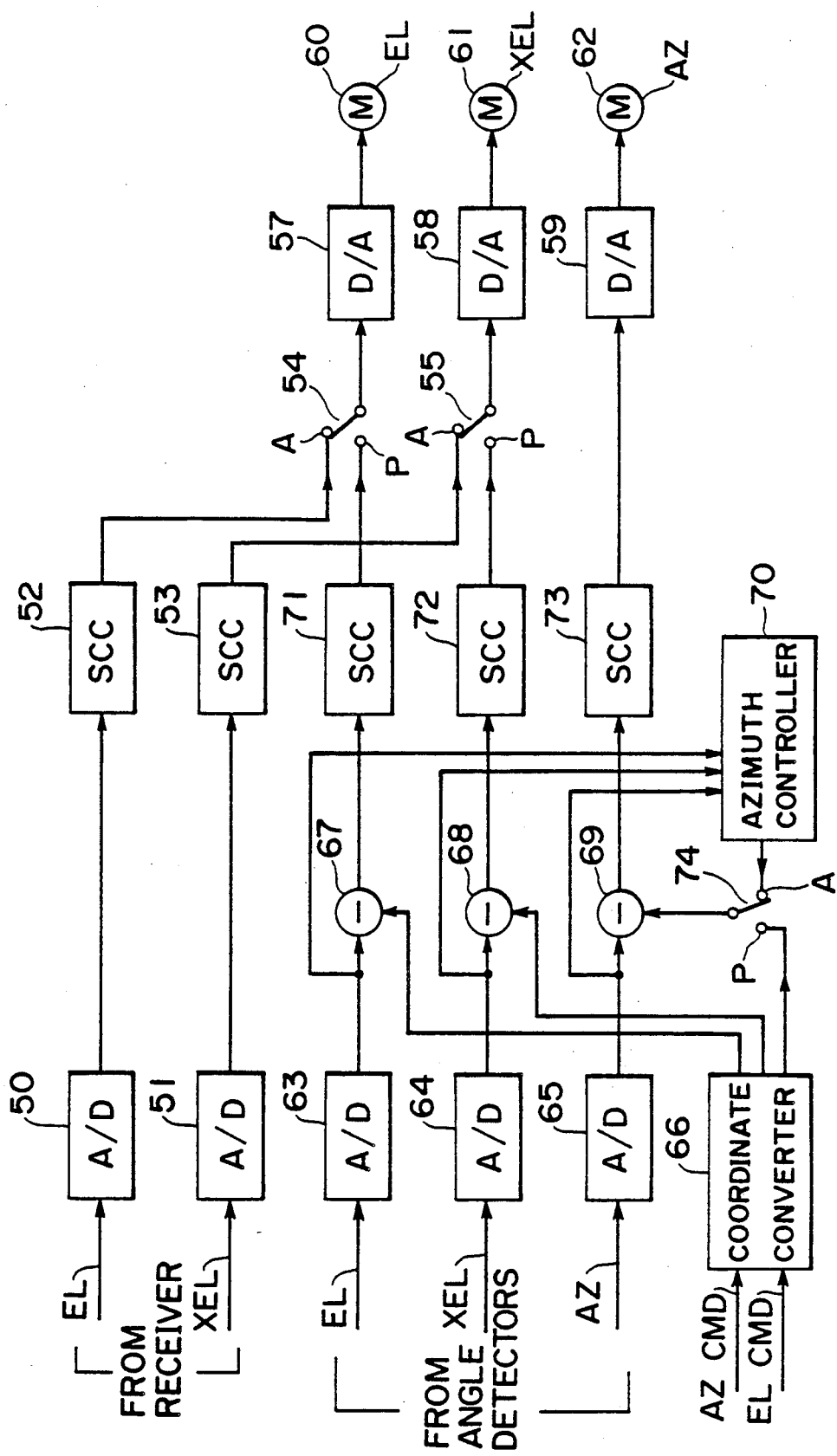
FIG. 5 is a block diagram of a tracking controller of the antenna system.

FIG. 5 shows a block diagram of a tracking controller for operating the antenna system just described. The tracking controller includes analog-to-digital converters 50 and 51 which convert the EL and XEL error signals from the receiver into digital signals which are fed to servo-control circuits 52 and 53, respectively. The outputs of servo-control circuits 52 and 53 are respectively applied to the A terminals of switches 54 and 55 which couple the error signals to digital-to-analog converters 57 and 58 when the system is operating in an automatic tracking mode. The outputs of digital-to-analog converters 57 and 58 are amplified and fed to EL and XEL motors 60 and 61, respectively. Signals from EL, XEL and AZ angle detectors are converted to digital signals by analog-to-digital converters 63, 64 and 65, respectively. A coordinate converter 66 provides coordinate conversion by translating AZ and EL command signals supplied from a known programming circuit, not shown, into EL, XEL and AZ signals. The El and XEL signals are combined with the outputs of analog-to-digital converters 63 and 64 in subtractors 67 and 68, respectively. During a programmed tracking mode, switch 74 is positioned to the P terminal, to apply the AZ signal from converter 66 to a subtractor 69 to be combined with the output of A/D converter 65. The outputs of subtractors 67, 68 and 69 are applied to servo-control circuits 71, 72 and 73 respectively. The outputs of servo-control circuits 71 and 72 are applied to the P terminals of switches 54 and 55 to D/A converters 57 and 58 when the system is operating in a programmed tracking mode and the output of servo-control circuit 73 is applied to a D/A converter 59 which drives azimuth motor 62. A microprocessor-based azimuth controller 70 receives inputs from the outputs of A/D converters 63, 64 and 65 to generate an AZ command signal for automatic tracking and applies its output through the A position of switch 74 to the subtractor 69.

Figure 6:
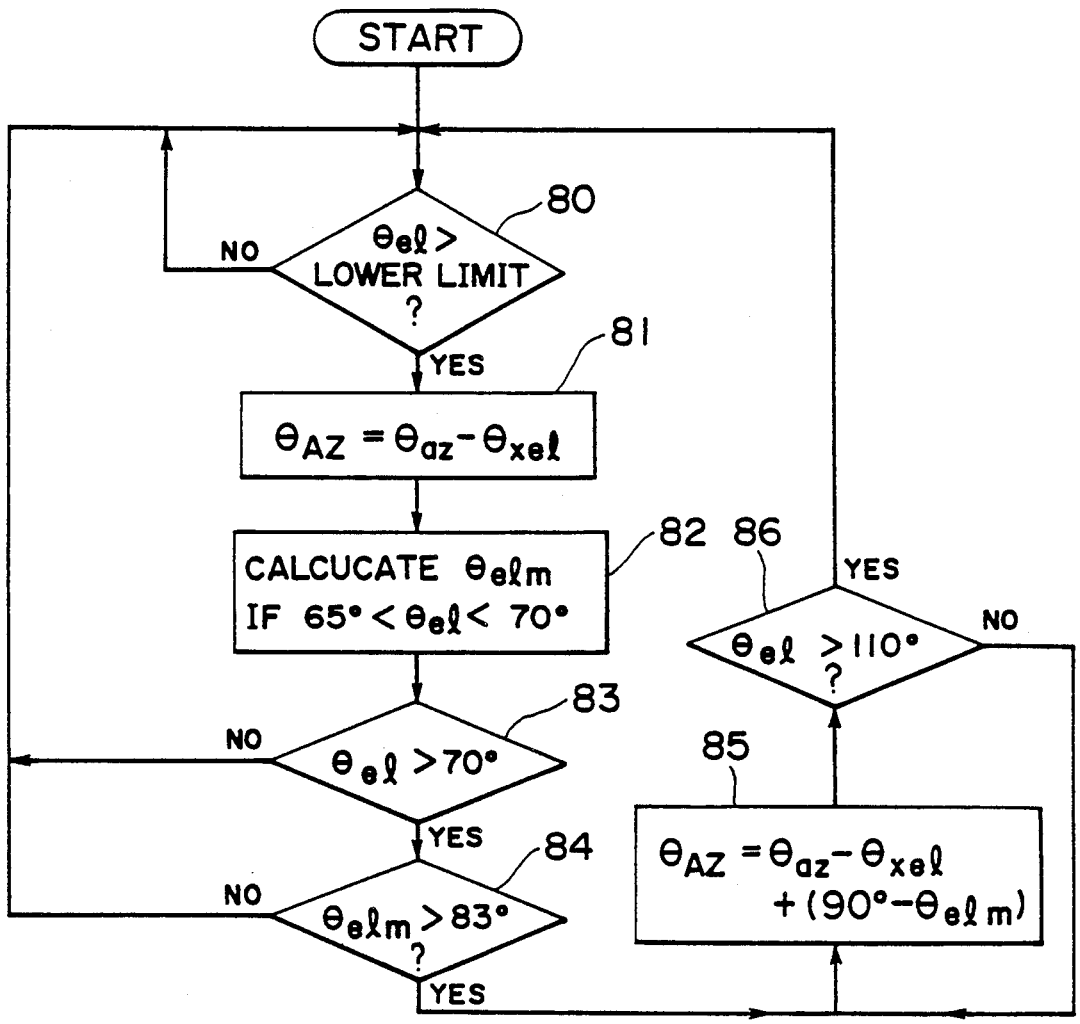
FIG. 6 is a flowchart describing a sequence of instructions performed by the azimuth controller of FIG. 5.

FIG. 6 shows a series of programmed instructions according to which the azimuth controller 70 operates during automatic tracking modes in which the EL and XEL motors 60 and 61 are driven respectively with the EL and XEL signals from the servo-control circuits 52 and 53. An azimuth control program starts with decision block 80 which determines whether the elevation angle of the antenna is greater than lower limit and if it is, the exit is to operations block 81 which directs the calculation of an equation $\theta_{AZ} = \theta_{az} - \theta_{xel}$, where $\theta_{AZ}$ represents the output signal of the azimuth controller 70 to be supplied to the subtractor 69 and $\theta_{az}$ and $\theta_{xel}$ represent respectively the AZ and cross-El angles of the antenna 6 represented by the outputs A/D converters 63 and 65. Exit then is to operations block 82 which directs the prediction of a satellite orbit to derive from it a maximum elevation angle $\theta_{elm}$ of the satellite as long as the antenna's elevation angle $\theta_{el}$ is in the range between 65 and 70 degrees. Control proceeds to decision block 83 which determines if the elevation angle $\theta_{el}$ is greater than 70 degrees. If the answer is negative, the exit from block 83 is to block 80 to execute the blocks 80 to 82. Therefore, the azimuth motor 62 is controlled so that $\theta_{xel}$ becomes equal to zero as long as the antenna's angle of elevation is smaller than 70 degrees.

If $\theta_{el}$ becomes greater than 70 degrees, control advances to decision block 84 which determines if the predicted maximum elevation angle $\theta_{elm}$ of the satellite NE-102 (017A/4) is greater than a predetermined value, typically 83 degrees. If the answer is negative, blocks 80 to 83 are executed again, and if it is affirmative, exit is to operations block 85 which directs the calculation of an equation $\theta_{AZ} = \theta_{az} - \theta_{xel} + (90° - \theta_{elm})$. Exit then is to decision block 86 which determines if $\theta_{el}$ is greater than 110 degrees, and if the answer is negative, exit is to block 85 to repeat its calculation. Therefore, if the predicted maximum elevation angle of the satellite is greater than 83 degrees and if the antenna's angle of elevation is in the range between 70 and 110 degrees, the azimuth motor 62 is controlled such that $\theta_{xel}$ becomes equal to $90° - \theta_{elm}$ and hence the antenna's azimuth angle becomes zero. When the answer in decision block 86 goes affirmative, exit is to block 80 to repeat the execution of blocks 81 to 84 until $\theta_{el}$ becomes smaller than the lower limit.

Figure 7:
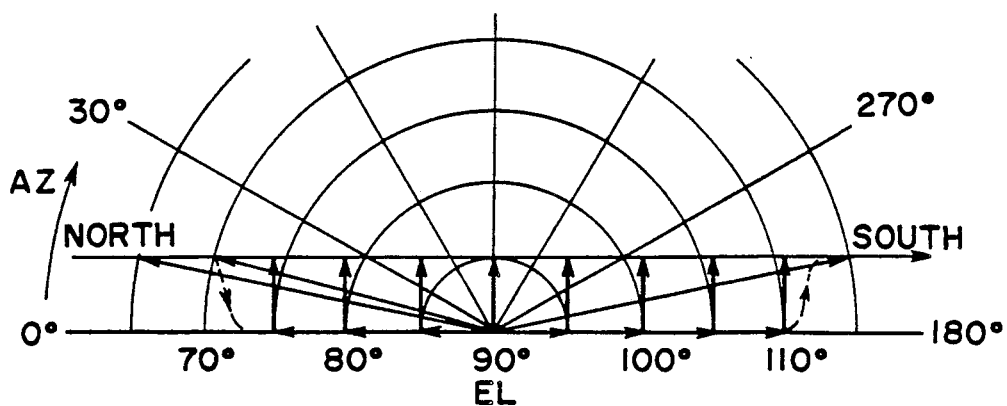
FIG. 7 is a vector diagram associated with the flowchart of FIG. 6.

FIG. 7 shows arrow-headed thick lines on a semicircular azimuth plane to indicate cross-elevation (XEL) vectors and elevation angles $\theta_{el}$ across the radial lines of the azimuth plane. Assume that a satellite is orbiting southwards with a maximum elevation angle of 85 degrees. Before the satellite reaches an elevation angle of 70 degrees, azimuth controller 70 provides execution of blocks 80 to 83 so that $\theta_{xel}$ constantly becomes zero degree and the elevation motor 60 and azimuth motor 62 are primarily used for tracking. When the satellite enters the range between 70 and 110 degrees of elevation, azimuth controller 70 provides execution of blocks 85 and 86 so that $\theta_{az}$ and $\theta_{xel}$ constantly become zero and 5 degrees, respectively, and the elevation motor 60 is primarily used for tracking. When the satellite leaves the 70-110 degree range, azimuth controller 70 provides execution of blocks 80 to 83 again so that $\theta_{xel}$ constantly becomes zero degree and the elevation motor 60 and azimuth motor 62 are primarily used for tracking.

It is seen therefore that when the system is tracking a satellite passing overhead (in the 70-110 degree range), the AZ command angle is set to a constant value independent of the elevation angle $\theta_{xl}$ and the $\theta_{el}$ angle data can be used exclusively for purposes of orbit prediction for the determination of satellite position and tracking mode switching to overhead pass. Therefore, the tracking controller can be simplified and no interference can occur between the three axes.

A further advantage of the present invention is that owing to the system's capability to 180-degree rotation about EL axis 35 the high speed azimuth rotation of antenna 6 is not required during overhead tracking.

Figure 8:
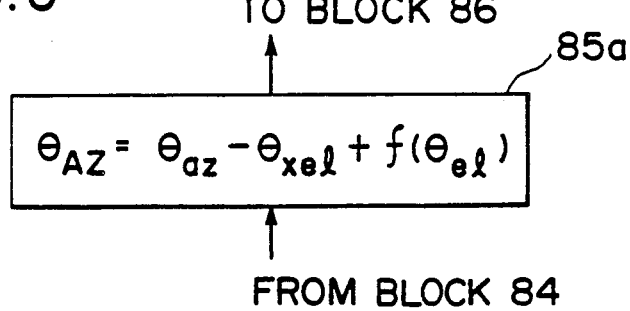
FIG. 8 is a modification of the FIG. 6 flowchart.
Figure 9:
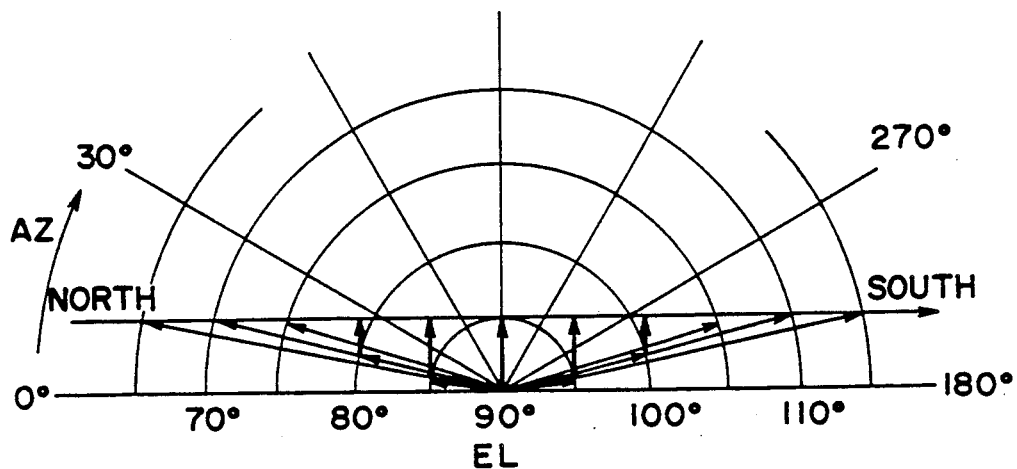
FIG. 9 is a vector diagram associated with the flowchart of FIG. 8.

With the flowchart of FIG. 6, however, there is a sudden change in the $\theta_{xel}$ vector at the entry to and exit from the overhead pass tracking mode as indicated by arrow-headed broken lines in FIG. 7. This can be avoided by replacing the third term $(90° - \theta_{elm})$ of the equation in block 85 with a term $f(\theta_{el})$ as shown in block 85a (FIG. 8). The term $f(\theta_{el})$ is a cosine function of $\theta_{el}$ over the range between 70 and 110 degrees of elevation angle at which it is zero and increases gradually to 5° at 90° point of the range. In this modification, a vector diagram as shown in FIG. 9 can be obtained.

Figure 11:
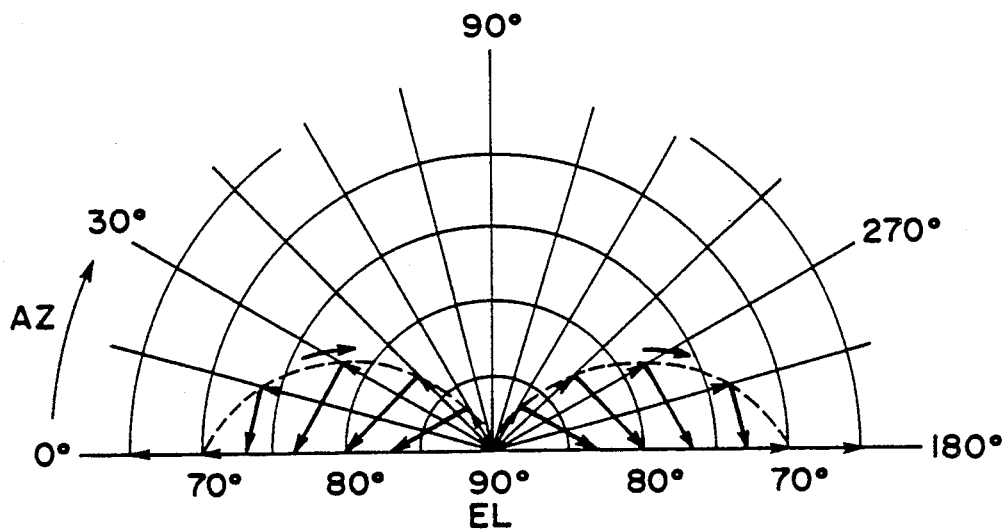
FIG. 11 is a vector diagram associated with the flowchart of FIG. 10
Figure 10:
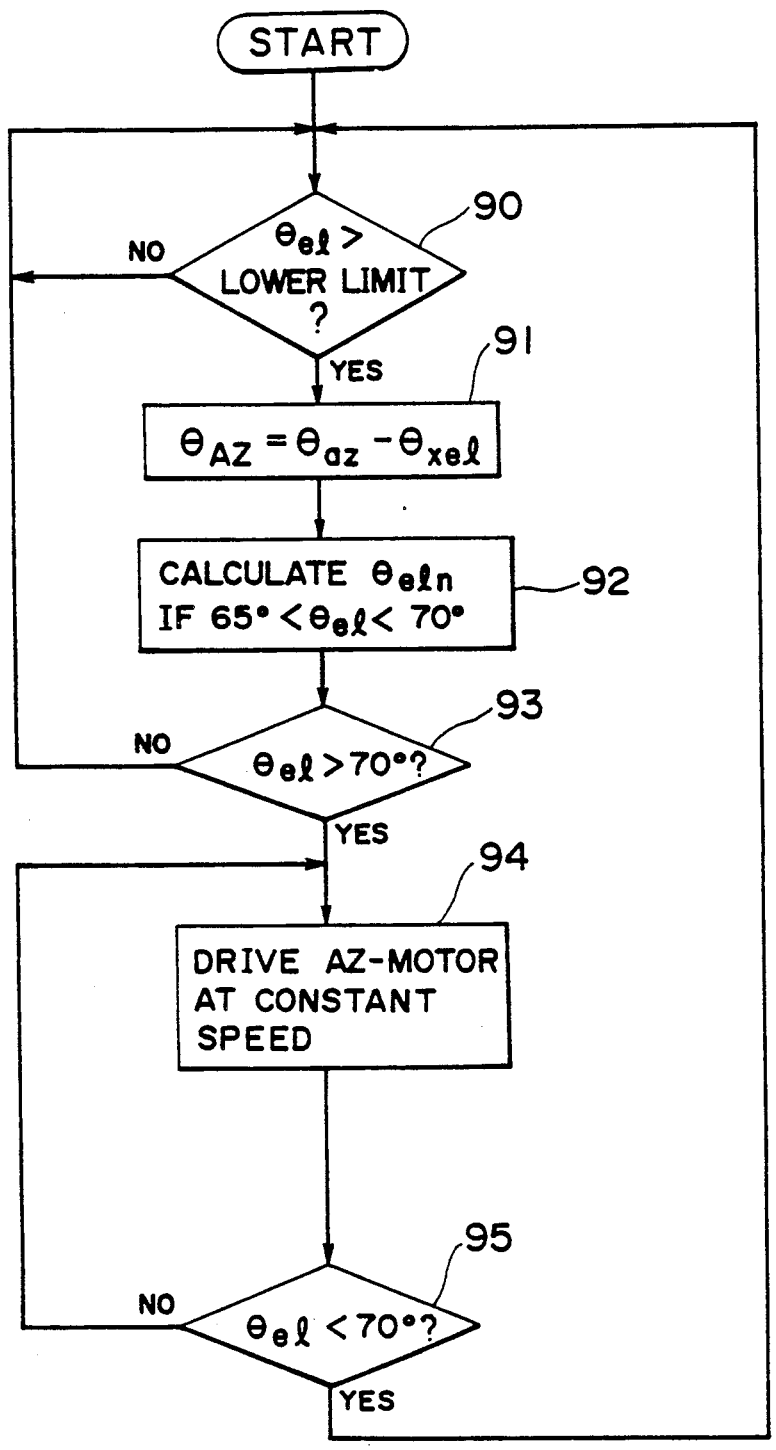
FIG. 10 is a flowchart describing a sequence of instructions programmed in a three-axis mount antenna system in which the antenna is rotatable about the horizontally extending elevation axis in the range between zero and 90 degrees to ground surface.

The tracking controller of FIG. 5 can also be used to advantage in the aforesaid three-axis mount in which the rotation about EL axis is limited to a maximum of 90 degrees. FIG. 10 is a flowchart describing programmed instructions for the azimuth controller 70 of the aforesaid three-axis mount. As in the previous embodiments, the EL and XEL motors 60 and 61 are constantly driven in response to their respective EL and XEL inputs. Program starts with operations blocks 90 to 93 which are respectively identical to blocks 80 to 83 of the flowchart of FIG. 6. When the answer at block 93 is affirmative, angle $\theta_{el}$ has reached a point appropriate for the antenna to begin azimuth rotation at a constant high speed and control proceeds to block 94 which directs the azimuth motor to be driven at a constant speed. Exit then is to decision block 95 which determines if $\theta_{el}$ becomes smaller than 70 degrees. If the answer is negative, control executes blocks 94 and 95, so that the antenna turns an additional 180 degrees about the aximuth axis to the angle attained at block 91. If the system is tracking a satellite making an overhead pass, a vector diagram for such satellites will appear as shown in FIG. 11 in which the EL and AZ angles vary as indicated by broken lines.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A tracking control system for controlling the orientation of an antenna for tracking a satellite, wherein the antenna is rotatable about a vertically extending azimuth axis, a horizontally extending elevation axis and a cross elevation axis extending in a direction normal to said horizontally extending elevation axis, and wherein receiver means is provided for receiving signals from said satellite and generating from the received signal a pair of first and second tracking signals having a quadratic relationship with each other, said first and second tracking signals respectively indicating the deviations of said orientation of the antenna in a coordinate system, said tracking control system comprising:
   first drive means for rotating said antenna about said horizontally extending elevation axis in response to said first tracking signal;
   second drive means for rotating said antenna about said cross elevation axis in response to said second tracking signal;
   angle detector means for detecting angles of said antenna about said azimuth and cross elevation axes;
   aximuth control means for deriving a third tracking signal from the angles detected by said angle detector means, said third tracking signal indicating a difference between the angles of said antenna about said azimuth axis and said cross elevation axis; and
   third drive means for rotating said antenna about said azimuth axis in response to said third tracking signal.

2. A tracking control system as claimed in claim 1, wherein said antenna is rotatable about said horizontally extending elevation axis in the range between zero and 180 degrees.

3. a tracking control system as claimed in calim 2, wherein said angle detector means further detects the angle of said antenna about said horizontally extending elevation axis, and wherein said azimuth control means is programmed to perform the following steps:
   (a) deriving said difference between the angles of said antenna respectively detected by said angle detector means about said azimuth axis and said cross elevation axis;
   (b) deriving a maximum angle of elevation of said satellite with respect to said antenna from the angles detected by said angle detector means;
   (c) determining whether the angle detected about said horizontally extending elevation axis exceeds a predetermined first value and determining whether said maximum elevation angle of said satellite exceeds a predetermined maximum value;
   (d) if at least one of the determinations of the step (c) results in a negative answer, repeating the steps (a), (b) and (c) to derive new values of said difference and said maximum elevation angle of said satellite and to effect said determinations on of said new values;
   (e) if both of the determinations of the step (c) result in affirmative answers, deriving a difference between the angles of said antenna detected by said angle detector means about said azimuth axis and said cross elevation axis, and adding a value to said difference as a funtion of said detected maximum elevation angle of said satellite;
   (f) determining whetehr the angle detected about said horizontally extending elevation axis is greater than a predetermined second value; and (g) if the determination of the step (f) results in a negative answer, repeating the steps (e) and (f) until the determinatioan of the step (f) results in an affirmative answer.

4. A tracking control system as claimed in claim 3, wherein the added value of the step (e) is a difference between 90 degrees and said detected maximum elevation angle of said satellite.

5. A tracking control system as claimed in claim 3, wherein the added value of the step (e) is variable as a cosine function of the angle of said antenna detected about said horizontally extending elevation axis, said cosine function having a maximum value equal to 90 degrees minus said detected maximum elevation angle of said satellite when the angle of said antenna about said horizontally extending elevation axis is 90 degrees with respect to ground and having a minimum value when the angle about said horizontally extending elevation axis is equal to each of said predetermined first and second values.

6. A tracking control system as claimed in claim 1, wherein said antenna is rotatable about said horizontally extending elevation axis in the range between zero and 90 degrees with respect to ground, and wherein said azimuth control means is programmed to perform the following steps:
(a) deriving said difference between the angles of said antenna detected by said angle detector means, said angles being taken about said azimuth axis and said cross elevation axis;
(b) determining whether the angle of said antenna detected about said horizontally extending elevation axis is greater than a predetermined value;
(c) if the determination of the step (b) results in a negative answer, repeating the steps (a) and (b) to derive a new value of said difference to effect said determination on said new value of the difference;
(d) if the determination of the step (b) results in an affirmative answer, controlling said third drive means so that said antenna rotates about said azimuth axis at a constant speed;
(e) determining whether the angle of said antenna detected about said horizontally extending elevation axis is smaller than said predetermined value; and
(f) if the determination of the step (e) results in a negative answer, repeating the steps (d) and (e) until the determination of the step (e) results in an affirmative answer.

7. An antenna system comprising:
a first support rotatable about a vertically extending azimuth axis;
a second support rotatable on said first support about a horizontally extending elevation axis;
a third support on said second support for rotatably supporting an antenna about a cross elevation axis extending in a direction normal to said horizontally extending elevation axis;
angle detector means for detecting the angles of said antenna about said azimuth and cross elevation axes;
azimuth control means for deriving an azimuth tracking signal from the angles detected by said angle detector means, said azimuth tracking signal indicating a difference bewteen the angles of said antenna detected by said angle detector means about said azimuth axis and said cross elevation axis;
elevation control means including a receiver for receiving signals from a satellite and deriving therefrom a pair of first and second tracking signals having a quadratic relationship with each other, said first and second tracking signals indicating the deviations of the orientation of said antenna in a coordinate system with respect to said satellite;
first drive means for rotating said first support in response to said azimuth tracking signal;
second drive means for rotating said second support in response to said first tracking signal; and
third drive means for rotating said third support in response to said second tracking signal.

8. An antenna system as claimed in claim 7, wherein said second support is rotatable in the range between zero and 180 degrees.

9. An antenna system as claimed in claim 8, wherien said angle detector means further detects the angle of said antenna about said horizontally extending elevation axis, and wherein said azimuth control means is programmed to perform the following steps:
(a) deriving said difference between the angles of said antenna detected by said angle detector means about said azimuth axis and said cross elevation axis;
(b) deriving a maximum angle of elevation of said satellite with respect to said antenna from the angles detected by said angle detector means;
(c) determining whether the angle detected about said horizontally extending axis exceeds a predetermined first value and determining whether said maximum elevation angle of said satellite exceeds a predetermined maximum value;
(d) if at least one of the determinations of the step (c) results in a negative answer, repeating the steps (a), (b) and (c) to derive new values of said difference and maximum angle to cause said determinations to be performed on said new values;
(e) if both of the determinations of the step (c) result in affirmative answers, deriving a difference between the angles of said antenna detected by said angle detector means about said azimuth axis and said cross elevation axis, and adding a value to said difference as a function of said detected maximum elevation angle of said satellite;
(f) determining whether the angle detected about said horizontally extending elevation axis is greater than a predetermined second value; and
(g) if the determination of the step (f) results in a negative answer, repeating the steps (e) and (f) until the determination of the step (f) results in an affirmative answer.

10. An antenna system as claimed in claim 9, wherein the added value of the step (e) is a difference between 90 degrees and said detected maximum elevation angle of said satellite.

11. An antenna system as claimed in claim 9, wherein the added value of the step (e) is variable as a cosine funtion of the angle detected about said horizontally extending axis, said cosein function having a maximum value equal to 90 degrees minus said detected maximum elevation angle of said satellite when the angle about said horizontally extending elevation axis is 90 degrees with respect to ground and having a minimum value when the angle of said satellite about said horizontally extending elevation axis is equal to each of said predetermined first and second values.

12. An antenna system as claimed in claim 7, wherein said second support is rotatable in the range between zero and 90 degrees with respect to ground, and wherein said azimuth control means is programmed to perform the following steps:

(a) deriving said difference between the angle of said antenna detected by said angle detector means about said azimuth axis and said cross elevation axis;

(b) determining whether the angle of said antenna detected about said horizontally extending elevation axis is greater than a predetermined value;

(c) if the determination of the step (b) results in a negative answer, repeating the steps (a) and (b) to derive a new value of said difference to cause said determination to be performed on said new value;

(d) if the determination of the step (b) results in an affirmative answer, controlling said first drive means so that said first support rotates at a constant speed;

(e) determining whether the angle of said satellite detected about said horizontally extending elevation axis is smaller than said predetermined value; and (f) if the determination of the step (e) results in a negative answer, repeating the steps (d) and (e) until the determination of the step (e) results in an affirmative answer.

13. An antenna system comprising:

a first support rotatable on a vertically extending azimuth a second support rotatable on said first support about a horizontally extending elevation axis in the range between zero and 180 degrees;

a third support on said second support for rotatably supporting an antenna about a cross elevation axis extending in a direction normal to said horizontally extending elevation axis;

first, second and third drive means for individually driving said first, second and third supports about the respective axes thereof; and tracking control means for deriving quadrature tracking signals from signals received from a satellite and supplying the derived tracking signals respectively to said second and third drive means and further deriving an aximuth tracking signal indicating a difference between angles of said antenna about said azimuth axis and said cross elevation axis and supplying the derived azimuth tracking signal to said first drive means, whereby said third support continuously rotates past a 90-degree point with respect to ground surface when said satellite moves past a near zenith point.

* * * * *